US012743258B2

(12) United States Patent
Ligman et al.

(10) Patent No.: US 12,743,258 B2
(45) Date of Patent: Sep. 22, 2026

(54) SYSTEMS AND METHODS FOR GENERATING CARBON EFFICIENT CODE

(71) Applicant: JPMORGAN CHASE BANK, N.A., New York, NY (US)

(72) Inventors: Joseph W Ligman, Weston, CT (US); Pranav Deshpande, Jersey City, NJ (US); Elvir Azanli, Union, NJ (US); Marco Pistoia, Amawalk, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 259 days.

(21) Appl. No.: 18/585,879

(22) Filed: Feb. 23, 2024

(65) Prior Publication Data

US 2025/0272067 A1 Aug. 28, 2025

(51) Int. Cl.
*G06F 8/35* (2018.01)
*G06N 5/046* (2023.01)

(52) U.S. Cl.
CPC ............... *G06F 8/35* (2013.01); *G06N 5/046* (2013.01)

(58) Field of Classification Search
CPC .................................. G06F 8/35; G06N 5/046
USPC .......................................................... 717/106
See application file for complete search history.

(56) References Cited

U.S. PATENT DOCUMENTS 9,087,195 B2 * 7/2015 Golovkin .............. G06F 21/563
11,074,256 B2 * 7/2021 Jindal ............... G06F 16/24534
12,166,688 B2 * 12/2024 Jain ..................... H04L 41/5019
12,591,804 B2 * 3/2026 Akdeniz ................ G06N 20/00
2014/0114637 A1 * 4/2014 Johnston ................. G06F 30/33 703/17
2017/0147292 A1 * 5/2017 Mauerer ................... G06F 8/33
2022/0398095 A1 * 12/2022 Weldemariam ........... G06F 8/76
2025/0094146 A1 * 3/2025 Vijayaraghavan ........ G06F 8/77

OTHER PUBLICATIONS

Liu, Yizhi, et al. "Optimizing {CNN} model inference on {CPUs}." 2019 USENIX Annual Technical Conference (USENIX ATC 19). 2019. pp. 1025-1040 (Year: 2019).*

(Continued)

*Primary Examiner* — Satish Rampuria
(74) *Attorney, Agent, or Firm* — GREENBERG TRAURIG LLP

(57) ABSTRACT

In some aspects, the techniques described herein relate to a method including: determining an optimal code block from a plurality of code blocks, wherein the plurality of code blocks each solve a predetermined problem, and wherein the optimal code block optimizes a coding efficiency; pairing the optimal code block with suboptimal code blocks from the plurality of code blocks, wherein the pairing generates suboptimal-to-optimal code pairs; training a machine learning model with the suboptimal-to-optimal code pairs, wherein the training fine-tunes the machine learning model for inferring edits to input code blocks, and wherein the edits to the input code blocks optimize the input code blocks in terms of the coding efficiency; receiving, at the machine learning model, an input code block; inferring, by the machine learning model, edits to the input code block; and outputting, by the machine learning model, an optimized code block based on the input code block.

11 Claims, 5 Drawing Sheets

(56) References Cited

OTHER PUBLICATIONS

Ojijo, Mourice O., and Olabisi E. Falowo. "A survey on slice admission control strategies and optimization schemes in 5G network." Ieee Access 8 (2020): pp. 14977-14990. (Year: 2020).*
Ballé, Johannes, et al. "Nonlinear transform coding." IEEE Journal of Selected Topics in Signal Processing 15.2 (2020): pp. 339-353. (Year: 2020).*
Yang, Chien-Sheng, Ramtin Pedarsani, and A. Salman Avestimehr. "Timely-throughput optimal coded computing over cloud networks." Proceedings of the Twentieth ACM International Symposium on Mobile Ad Hoc Networking and Computing. 2019.pp. 301-310. (Year: 2019).*
Zhang, Yuan, et al. "To offload or not to offload: An efficient code partition algorithm for mobile cloud computing." 2012 IEEE 1st International Conference on Cloud Networking (CLOUDNET). IEEE, 2012. pp. 1-7. (Year: 2012).*
Li, Jian, et al. "Towards green IoT networking: Performance optimization of network coding based communication and reliable storage." IEEE Access 5 (2017): pp. 8780-8791. (Year: 2017).*

* cited by examiner

SYSTEMS AND METHODS FOR GENERATING CARBON EFFICIENT CODE

BACKGROUND

1. Field of the Disclosure

Aspects generally relate to systems and methods for generating carbon efficient code.

2. Description of the Related Art

Science has shown the correlation between carbon emissions and global warming. As greenhouse gas is released into the earth's atmosphere the sun's heat is trapped allowing global surface temperature to maintain above freezing. This is a necessary phenomenon to maintain life on earth, however, as we have seen over the last few decades, excessive greenhouse gas may result in a disastrous impact supercharging the warming of the planet. The impact of excess heat converted to energy results in major storms, causing global impact with more frequent occurrence of major storms causing loss of life and economic catastrophe. The National Oceanic and Atmospheric Administration (NOAA) estimates the cost of weather disasters every year in the US alone to total more than 165 billion dollars.

Cloud computing, and computing in general, is responsible for a significant and growing percentage of this excessive carbon. Recent research shows cloud computing now has a greater carbon footprint than the airline industry. A single data center can consume the equivalent electricity of 50,000 homes.

SUMMARY

In some aspects, the techniques described herein relate to a method including: determining an optimal code block from a plurality of code blocks, wherein the plurality of code blocks each solve a predetermined problem, and wherein the optimal code block optimizes a coding efficiency; pairing the optimal code block with suboptimal code blocks from the plurality of code blocks, wherein the pairing generates suboptimal-to-optimal code pairs; and training a machine learning model with the suboptimal-to-optimal code pairs, wherein the training fine-tunes the machine learning model for inferring edits to input code blocks, and wherein the edits to the input code blocks optimize the input code blocks in terms of the coding efficiency.

In some aspects, the techniques described herein relate to a method, including: receiving, at the machine learning model, an input code block; inferring, by the machine learning model, edits to the input code block; and outputting, by the machine learning model, an optimized code block based on the input code block.

In some aspects, the techniques described herein relate to a method, wherein the input code block is received from an integrated development environment (IDE) program.

In some aspects, the techniques described herein relate to a method, wherein the machine learning model is executed on a same device as the IDE program.

In some aspects, the techniques described herein relate to a method, wherein the machine learning model is executed on a remote server.

In some aspects, the techniques described herein relate to a method, wherein the coding efficiency is carbon efficiency.

In some aspects, the techniques described herein relate to a method, including: executing each code block in the plurality of code blocks; analyzing metrics generated for each code block during execution; and ranking each code block based on the metrics, wherein the optimal code block is a highest-ranking code block.

In some aspects, the techniques described herein relate to a system including at least one computer including a processor and a memory, wherein the at least one computer is configured to: determine an optimal code block from a plurality of code blocks, wherein the plurality of code blocks each solve a predetermined problem, and wherein the optimal code block optimizes a coding efficiency; pair the optimal code block with suboptimal code blocks from the plurality of code blocks, wherein the pairing generates suboptimal-to-optimal code pairs; and train a machine learning model with the suboptimal-to-optimal code pairs, wherein the training fine-tunes the machine learning model for inferring edits to input code blocks, and wherein the edits to the input code blocks optimize the input code blocks in terms of the coding efficiency.

In some aspects, the techniques described herein relate to a system, wherein the at least one computer is configured to: receive, at the machine learning model, an input code block; infer, by the machine learning model, edits to the input code block; and output, by the machine learning model, an optimized code block based on the input code block.

In some aspects, the techniques described herein relate to a system, wherein the input code block is received from an integrated development environment (IDE) program.

In some aspects, the techniques described herein relate to a system, wherein the machine learning model is executed on a same device as the IDE program.

In some aspects, the techniques described herein relate to a system, wherein the machine learning model is executed on a remote server.

In some aspects, the techniques described herein relate to a system, wherein the coding efficiency is carbon efficiency.

In some aspects, the techniques described herein relate to a system, including: executing each code block in the plurality of code blocks; analyzing metrics generated for each code block during execution; and ranking each code block based on the metrics, wherein the optimal code block is a highest-ranking code block.

In some aspects, the techniques described herein relate to a non-transitory computer readable storage medium, including instructions stored thereon, which instructions, when read and executed by one or more computer processors, cause the one or more computer processors to perform steps including: determining an optimal code block from a plurality of code blocks, wherein the plurality of code blocks each solve a predetermined problem, and wherein the optimal code block optimizes a coding efficiency; pairing the optimal code block with suboptimal code blocks from the plurality of code blocks, wherein the pairing generates suboptimal-to-optimal code pairs; and training a machine learning model with the suboptimal-to-optimal code pairs, wherein the training fine-tunes the machine learning model for inferring edits to input code blocks, and wherein the edits to the input code blocks optimize the input code blocks in terms of the coding efficiency.

In some aspects, the techniques described herein relate to a non-transitory computer readable storage medium, including: receiving, at the machine learning model, an input code block; inferring, by the machine learning model, edits to the input code block; and outputting, by the machine learning model, an optimized code block based on the input code block.

In some aspects, the techniques described herein relate to a non-transitory computer readable storage medium, wherein the input code block is received from an integrated development environment (IDE) program.

In some aspects, the techniques described herein relate to a non-transitory computer readable storage medium, wherein the machine learning model is executed on a remote server.

In some aspects, the techniques described herein relate to a non-transitory computer readable storage medium, wherein the coding efficiency is carbon efficiency.

In some aspects, the techniques described herein relate to a non-transitory computer readable storage medium, including: executing each code block in the plurality of code blocks; analyzing metrics generated for each code block during execution; and ranking each code block based on the metrics, wherein the optimal code block is a highest-ranking code block.

DETAILED DESCRIPTION

Figure 1:
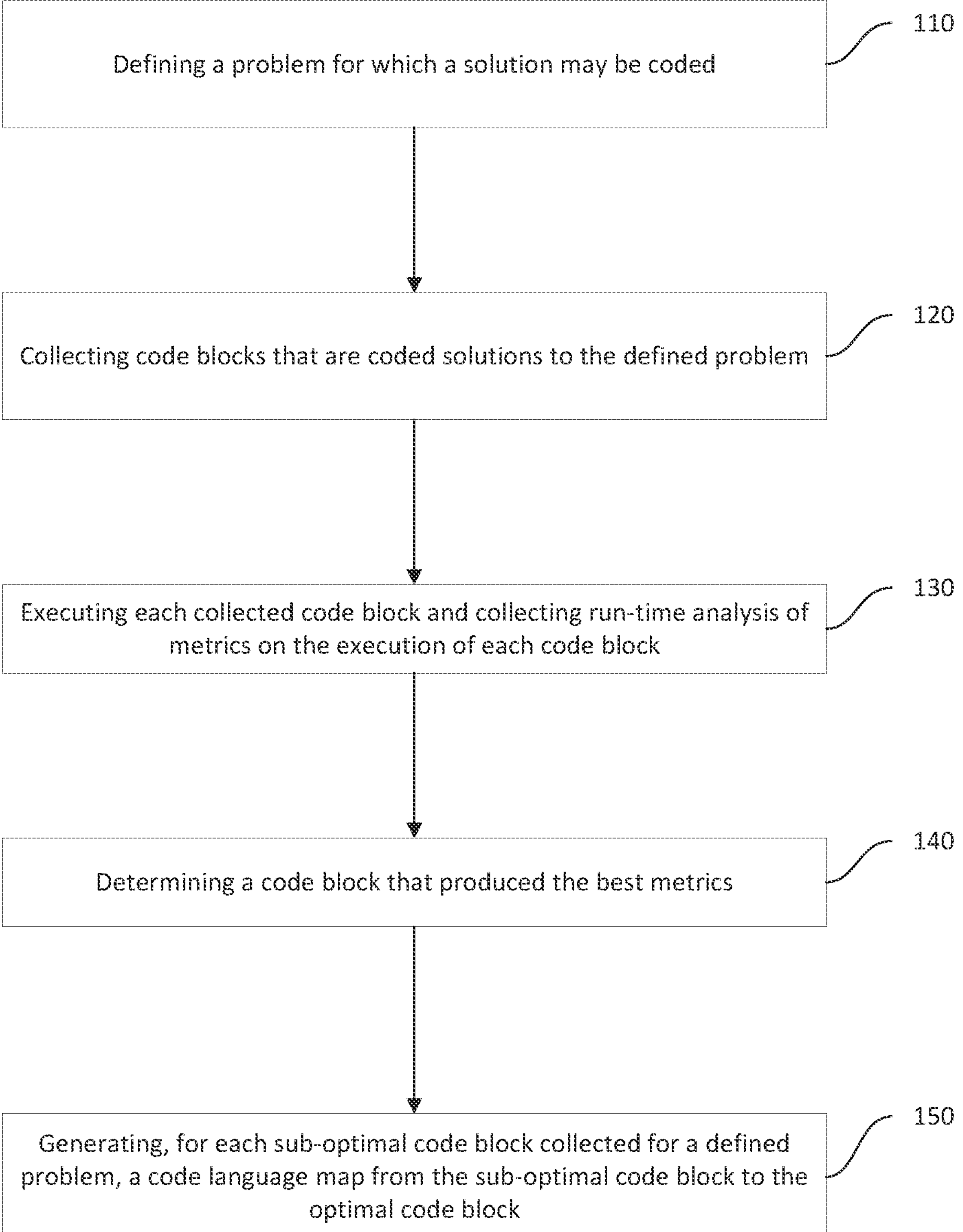
FIG. 1 illustrates a logical flow for pairing sub optimal code solutions to optimal code solutions, in accordance with aspects.

Aspects generally relate to systems and methods for generating carbon efficient code.

Aspects described herein may provide suggested code edits where the suggested code edits are formulated to improve the carbon efficiency of a computer program. Implementations described herein may be based on solving a language problem where one aspect may use a deep-learning architecture trained on code examples to understand, through language modeling, how to suggest changes or edits to code that will improve the running efficiency of a computer program implementing the edited code.

Systems and methods described herein may further extend aspects of research from other code generation tools. Examples of problems solved by these code generation tools are code completion (i.e., given an incomplete code snippet, completing the code snippet to form compile-able and executable code) or code summarization (given a long code snippet generate a summary (e.g., a human readable summary) of the code).

Aspects may train a deep learning model to understand how to tune code for carbon efficiency. The output of the training phase produces a model that is used as part of a running system to make suggestions to the end user on how to modify their code. These suggestions are produced by an execution or inference performed by the trained model where the model will make suggestions with respect to code that the model has not been exposed to before. For example, given a sub-optimally coded solution (e.g., from the standpoint of carbon or running efficiency) a model's output inference will generate an optimal energy conserving version of the input code that produces the same computational result as the input code, but with less carbon cost created (i.e., having more carbon efficiency) upon execution of the program that includes the inferred code.

Aspects may provide an output (i.e., inferred code generation) that may be in the form of a set of recommendations and that allow an end-user to choose to implement or to override the generated output code suggestions. Inferred code generation may be run as part of an integrated development environment (IDE) or code editor, as a stand-alone tool, or running as a client-server architecture accessed through a set of application programming interfaces (APIs). In some aspects, the output may be presented either as alternate code suggestions (with respect to end-user generated code). In other aspects, systems and methods may be configured to change the code automatically, without end-user input.

In accordance with aspects, generated code that has been optimized for carbon efficiency may come with penalties in other computing performance domains. Accordingly, the level of efficiency may be configured by the end user, administrators, etc. For example, the system may be configured more for cost savings in various compute domains and less for carbon efficiency, or vice versa.

Language modeling is the task of predicting what word comes next in a body of text. Language modeling generally works by assigning a probability to a piece of text. Today, many typical language models are based on transformer deep learning architectures. These architectures are based on self-supervised learning with unsupervised pretraining followed by supervised fine-tuning.

A "Transformer" deep learning architecture is an improvement on the recurrent neural network (RNN) which is a bidirectional artificial neural network that allows output from internal nodes to flow to input of the same nodes. This internal state provides a memory for processing arbitrary sequences of inputs. RNNs originally made use of long short-term memory (LSTM) networks which are deep learning systems that prevent backpropagated errors from vanishing. This LSTM memory can learn tasks based on events that happened very few or millions of discrete steps earlier. The LSTM is used for processing sequential data using an encoder/decoder architecture, where the encoder passes a single vector to the decoder containing all encoded states. This encoder/decoder architecture is improved by using a technique referred to as "Attention".

Instead of relying on a single encoded vector, Attention makes use of looking at every hidden state from each decoder every time, rather than looking only at the final decoded state. Attention follows the following steps: encoding, computing attention weights, creating the context vector, decoding and translation. The next architecture advancement based on Attention is the "Transformer" which is a deep learning architecture not containing any recurrent units and which also requires less training time then most RNNs. The Transformer consists of the following: a text tokenizer, a single vectorizing embedding layer converting token position into vector representations, transform layers that perform transformations on the vector representations, and un-embedding layer which converts the final vector representations back to a probability distribution over the tokens.

More recently, pretrained large language models (LLMs) have been used to understand code blocks. This approach extracts features from code blocks and embeds them into a vector representation, where the feature vectors are used to learn from classified pre-defined sets of classes. Other examples make use of fine-tuning LLMs for program optimization. Fine-tuning involves taking the pre-trained LLM and training it further on a smaller, task-specific dataset. This process helps the model adapt its knowledge to a particular context of the task, refining its predictions and making it more specialized in delivering accurate results for those specific use cases.

Aspects described herein may provide a systems and methods derived from and based on generative artificial intelligence (AI). Aspects may be developed around the concept of adapting a large language model to the problem of reducing energy consumption (i.e., promoting carbon efficiency) in a computer application or program. Aspects may include components as described in further detail, herein.

Aspects may include a data set of carbon efficient code examples (a code dataset). This dataset may be based on existing or synthetic code samples. Aspects may be extensible to datasets in any compiled or interpreted programming language. The code samples in the code dataset may be validated as correct by passing them through a linter or static analyzer and then running them against a set of unit tests to make sure they produce the correct output. The code dataset may include of a set of solutions for a specific problem, where a single code solution may have one or more related solutions that have been tested to reduce the carbon cost and increase the carbon efficiency of an executing system. This carbon cost benefit is determined empirically by measuring the power consumed during execution in a controlled runtime environment against a set of unit tests. Additionally, the tools required for measuring carbon cost may be extended to financial cost or performance runtime in certain cases.

Aspects may also include systems and procedures for measuring power, energy, or cost consumption. Aspects may monitor several (e.g., up to millions) of running programs to determine a base line. These may include various libraries from various commercial providers that monitor power consumption on microprocessors such as graphics processing units (GPUs), that execute APIs, etc. System logs that instrument API calls may be used as feedback to an LLM. Output from cost optimization aggregators that determine if a program is using the optimal memory, compute, storage may be used to collect feedback for an LLM. Billing versus utilization comparisons may be used to determine if a system is not using the correct infrastructure size. Examples include medium to tiny upgrades or moving to use other services. Refactoring systems may be used to determine whether an end-user should buy or rent a system or hardware by analyzing data at the service instance account pricing mode. Aspects may analyze compute versus allocated resources, to determine if executing code supports the single instruction, multiple data (SIMD) type of parallel processing and whether code is executing on the most efficient type of processors. Containerized application engines may compute allocation that may be assigned by tags and using affinity to isolate workloads. Logs from these and other data sources may be sent to a resource manager, and medium and best examples may be paired from any non-optimal solution to a more optimal solution.

Aspects may include a deep learning model for trained and configured to understanding code intention as a language problem. The system may use transfer-learning or fine-tuning to train an LLM as desired. The system may use a combination of supervised, self-supervised, and reinforcement learning for understanding how to analyze and recommend edits to improve the best energy or cost-efficient solution for a given code block. A deep-learning model may be based on a generative LLM.

Aspects may include generative AI that embodies a language model (e.g., an LLM) developed with the following assumptions. The architecture is developed from a base autoregressive LLM. This base model is trained to output the next logical text statement from a given text input prompt across a various amount of uncategorized text data. This results in a foundational model that is customized or tuned using a collected dataset of code blocks that execute specific computer routines. Using a foundational model is not necessary to achieve the described aspects. A foundational model, however, may be an economical way to arrive at the attendant benefits of the described aspect, in practice.

Foundation models may be trained using very large computing resources on an extremely large corpus. Aspects may use this domain adaption to achieve good performance using less specific programming and power consumption data. Aspects may additionally benefit from instruction-based fine tuning using labeled data to improve the performance as well as prompt engineering and other procedures for improving inference results.

Aspects may include context aware code completion systems and procedures for executing inference and generating output code from the trained model and/or for recommending optional cost savings and/or carbon efficient solutions. Aspects may be installed as a plugin to, or compiled directly into, a source code editor or IDE. A recommendation system architecture may have multiple solutions based on the computational power of the client-side device. In some aspects, an inference and code generation solution, as described herein, may run as a client-server process, where the client makes a single request passing the relevant code block to the server. The server may then run the inference computation and return generated code and/or recommendations for carbon efficiency.

Some aspects may use prompting to engineer more optimal solutions, examples include "do prompting." That is, rather than telling the model what not to do, an end-user may inform the model specifically what to do. Other aspects may include "few-shot" prompting that provides the model with several examples of what to produce rather than a single "zero-shot" solution.

In accordance with aspects, a process for generating carbon efficient code may include data collection. Code blocks may be extracted from existing code solutions or synthetically generated. The collected code blocks may be compiled and executed on a test system where runtime metrics are collected for power, energy, cost consumption, and other data. Aspects may then rank the collected code blocks with an improvement score, where lower ranked blocks are paired with higher ranked blocks and where the higher-ranked blocks are exemplary blocks for describing edits required to find the optimal solution for reducing power consumption and thereby provide carbon efficient code. In accordance with aspects, an improvement score may reflect captured runtime analysis in the form of metrics such as CPU utilization, memory usage/allocation, data transfer, API calls, power consumption, cost, system utilization, or other relevant computational metrics related to energy conservation and carbon efficiency.

FIG. 1 illustrates a logical flow for pairing sub optimal code solutions to optimal code solutions, in accordance with aspects. Step 110 includes defining a problem for which a solution may be coded, and which code may provide a solution for the defined problem. Step 120 includes collecting code blocks that are coded solutions to the defined problem. Code blocks may be extracted from existing coded solutions or synthetically generated. Step 130 includes executing each collected code block and collecting run-time analysis as described herein on the execution of each code block.

For a given problem definition, all collected code blocks may be executed on a clean system (i.e., system memory and other variables may be cleared/reset before execution of each collected code block) and runtime cost metrics are captured for each execution. Step 140 includes determining a code block that produced the best metrics (i.e., the highest improvement score) during execution. This may be referred to as an optimal code block. An optimal code block may be a code block that is determined to have generated the most carbon efficient metrics when executed, and other code blocks may be referred to as suboptimal code blocks.

An optimal code block may be determined after each collected code block has been executed. Step 150 includes generating, for each suboptimal code block collected for a defined problem, a code language map from the suboptimal code block to the optimal code block. Each suboptimal code block mapped to an optimal code block with a language map may be a suboptimal-to-optimal code pair. The described process for code block collection and suboptimal-to-optimal code pair generation may be repeated for any number of defined problems. Aspects may use a set of suboptimal-to-optimal code pairs as a dataset for fine-tuning a selected LLM or foundational model.

In accordance with aspects, a process for generating carbon efficient code may include fine tuning a foundational large language model (LLM). Aspects may extend the model training paradigm by providing, as training data, suboptimal-to-optimal code pairs collected during the data processing. The suboptimal-to-optimal code pairs may be used to teach a foundational LLM model what code related changes are necessary to improve the economy of a given input code block in terms of either computation cost, financial cost, power consumption, etc. The suboptimal-to-optimal code pairs may be used as language state representation examples. In accordance with aspects, fine-tuning a model using suboptimal-to-optimal code pairs may produce the best results with a relatively smaller amount of labeled data than would be required for training a model from scratch. Aspects may produce a carbon-efficient natural language model that is derived from a foundational LLM through fine tuning with suboptimal-to-optimal code pairs.

Figure 2:
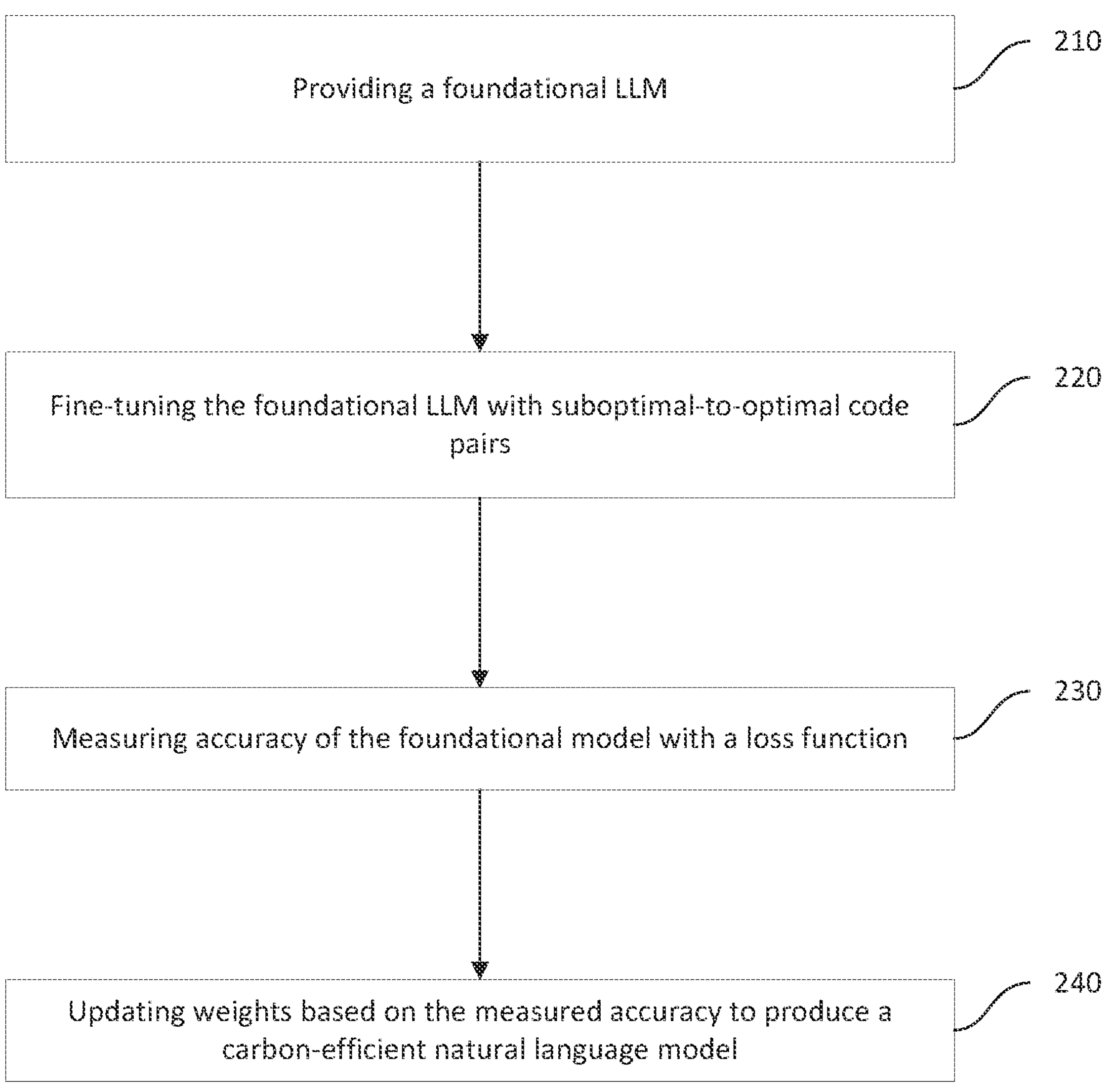
FIG. 2 illustrates a logical flow for producing a carbon-efficient natural language model, in accordance with aspects.

FIG. 2 illustrates a logical flow for producing a carbon-efficient natural language model, in accordance with aspects. Step 210 includes providing a foundational LLM. Step 220 includes fine-tuning the foundational LLM with suboptimal-to-optimal code pairs. Step 230 includes measuring accuracy of the foundational model with a loss function. Step 240 includes updating weights of the foundational model based on the measured accuracy to produce a carbon-efficient natural language model based on the with suboptimal-to-optimal code pairs.

In accordance with aspects, program analysis may be undertaken for validating correct coding outputs from a code generation process. A system and/or process may make use of static analysis and other techniques from program analysist to make sure code produced by an LLM is structurally correct. The static analysis phase may compile or interpret the inferred (generated) solution according to the grammar defined by the programming language in question. Aspects may additionally examine the execution environment configuration and architecture. Code edits may be suggested if generated code will not compile or if generated code will not pass applicable unit tests.

Developers regularly rely on context aware code completion in code editors and IDEs. Aspects may incorporate a recommendation system that accepts multi-line input, where end users may provide additional input in the form of selection prompts around relevant code blocks. A recommendation system may run independently of a user input prompt. A system architecture for the recommendation system may be a local system, where the machine learning model is compiled to run directly on a developer's machine, or it may run as a client-server architecture making inference suggestions on the server and transmitting the results to the client using standard protocols. Prior to running inference (i.e., code generation), an input code block may first be checked semantically and then may be processed by a model (such as an LLM) trained as described herein. In a client-server architecture, results may be sent back to the client in the form of code recommendations.

Figure 3:
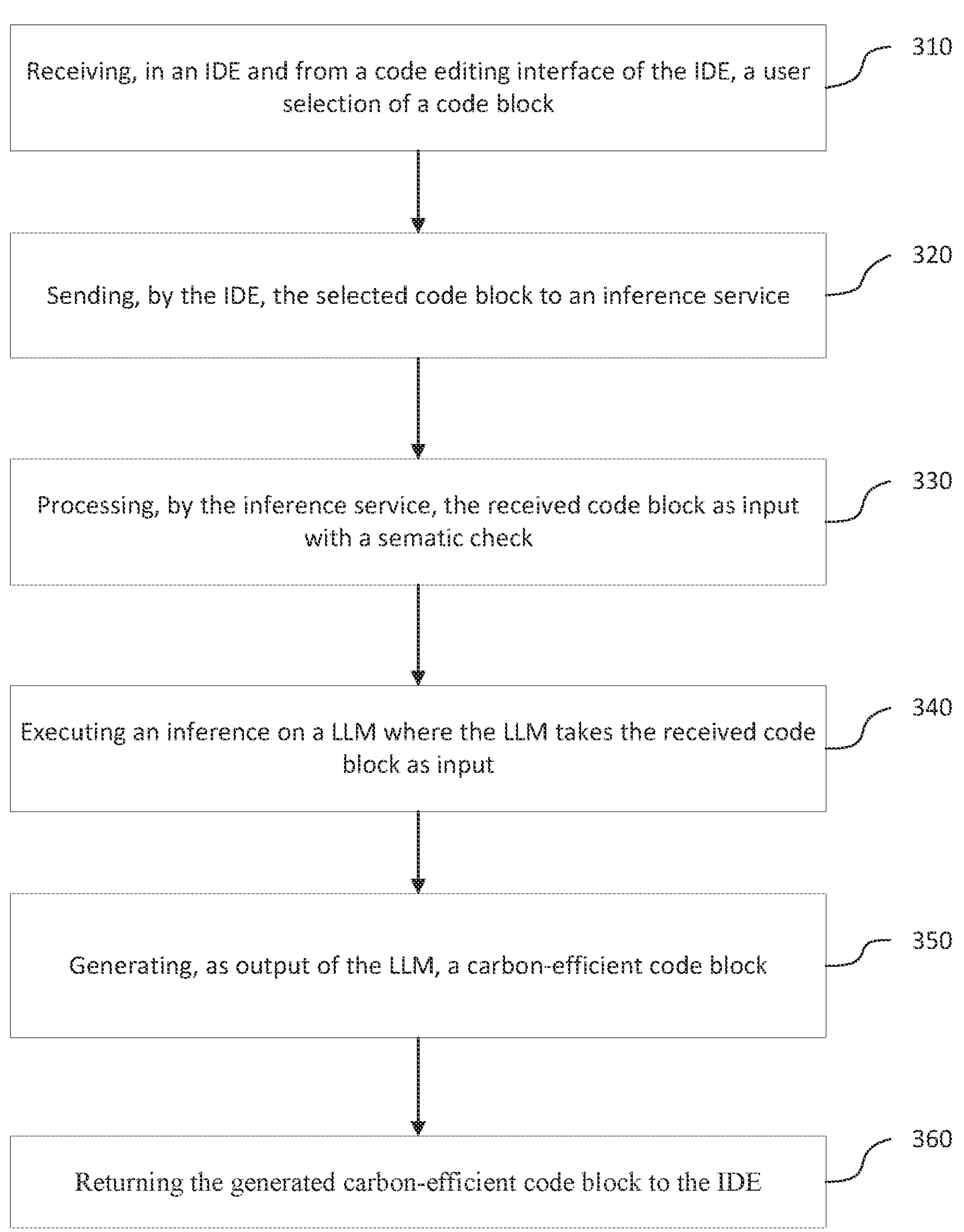
FIG. 3 illustrates a logical flow for IDE integration of recommendation inference analysis, in accordance with aspects.

FIG. 3 illustrates a logical flow for IDE integration of recommendation inference analysis, in accordance with aspects. Step 310 includes receiving, in an IDE and from a code editing interface of the IDE, a user selection of a code block. Step 320 includes sending, by the IDE, the selected code block to an inference service. In some aspects, the inference service may be running as a module in the IDE environment, and in other aspects, the inference service may be running on a remote server and may communicated to the server using standard computer network protocols. Step 330 includes processing, by the inference service, the received code block as input with a sematic check. Step 340 includes executing an inference on a LLM where the LLM takes the received code block as input. Step 350 includes generating, as output, a carbon-efficient code block. The generated carbon-efficient code block may solve the same problem as the input code block but may be structured in a more carbon efficient way. Step 360 includes returning the generated carbon-efficient code block to the IDE. If the returned code block is from a server, then it may be returned via a computer network using standard protocols. The IDE may implement the returned code in the code editing interface, may allow for a selection of the returned code by a user of the IDE, etc.

Figure 4:
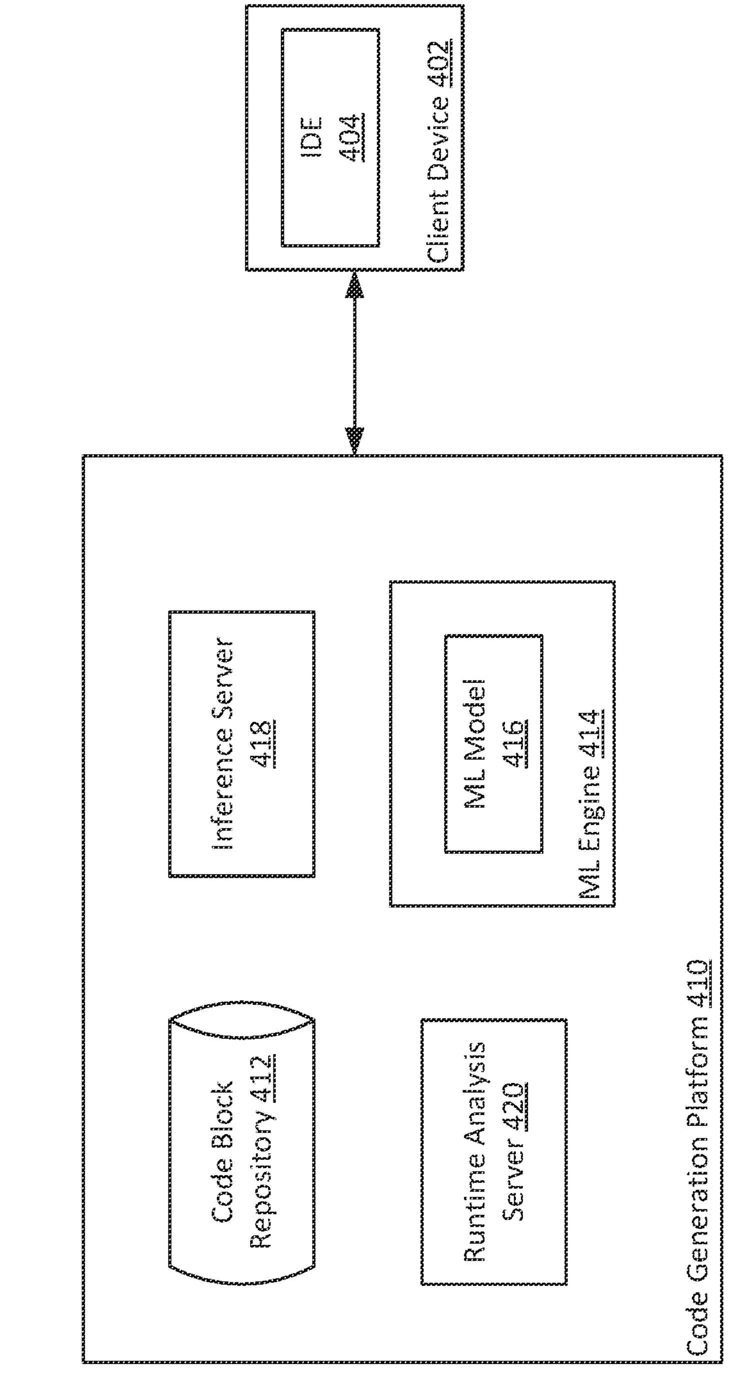
FIG. 4 illustrates a system for generating carbon efficient code, in accordance with aspects.

FIG. 4 illustrates a system for generating carbon efficient code, in accordance with aspects. System 400 includes code generation platform 410, code block repository 412, runtime analysis server 420, machine learning (ML) engine 414, and inference server 418. ML engine 414 includes ML model 416. System 400 further includes client device 402, which executes IDE 404. Code generation platform 410 and/or client device 402 may be included in an implementing organization's technology infrastructure. Components of code generation platform 410 may be in operative communication with each other via appropriate computer network protocols, APIs, etc., as described in more detail, herein.

In accordance with aspects, code block repository 412 may store collected code blocks. The stored code blocks may be collected from existing coded solutions or may be synthetically generated. The code blocks may include a coded solution for a defined problem. The code blocks may be used to generate suboptimal-to-optimal code pair generation, as described in more detail, herein. Code block repository 412 may be any suitable datastore for storing code blocks. For instance, code block repository 412 may be a suitable source code repository, a relational database, a NoSQL database, a data lake, etc.

In accordance with aspects, runtime analysis server 420 may be configured to execute code blocks stored in code block repository 412 and to analyze metrics to determine an optimal code block for a defined problem and suboptimal code blocks that solve the defined problem. Runtime analysis server 420 may then be configured to determine suboptimal-to-optimal code pairs based on the analysis, as described in more detail, herein.

In accordance with aspects, ML engine 414 may store and execute ML model 416. ML engine 414 may be configured for fine-tuning of ML model 416 using suboptimal-to-optimal code pair generation, as described in more detail, herein. ML model 416 may be a language model such as an LLM. ML model 416 may be a pretrained foundation model that may be fine-tuned for inference operations that generate carbon-efficient code blocks. ML engine 414 may be configured to train ML model 416 on suboptimal-to-optimal code pairs such that ML model 416 may infer code related changes that are necessary to improve the economy of a given input code block in terms of either computation cost, financial cost, power consumption, etc. That is, the suboptimal-to-optimal code pairs may be used as language state representation examples.

In accordance with aspects, client device 402 may be in operative communication with code generation platform 410. Client device 402 may execute IDE 404, which may be a code editing interface and/or an integrated development environment. IDE 404 may be configured to send a code block selected by an end user for inference by ML model 416. In some aspects, IDE 404 may be configured to retrieve/receive a copy of ML model 416 (e.g., a copy that has been fine-tuned to generate carbon-efficient code blocks via an inference operation). The copy of ML model 416 may be stored and executed locally on client device 402 and the inference operation may take place locally on client device 402.

In other aspects, IDE 404 may as a configured in a client-server architecture and IDE 404 may be in operative communication with inference server 418. Inference server 418 may be configured to receive a code block from an end user of IDE 404 and interface with ML model 416 to perform an inference operation using the received code block as input to ML model 416, where the inference operation generates a carbon-efficient code block that solves the same problem as the input code block.

Figure 5:
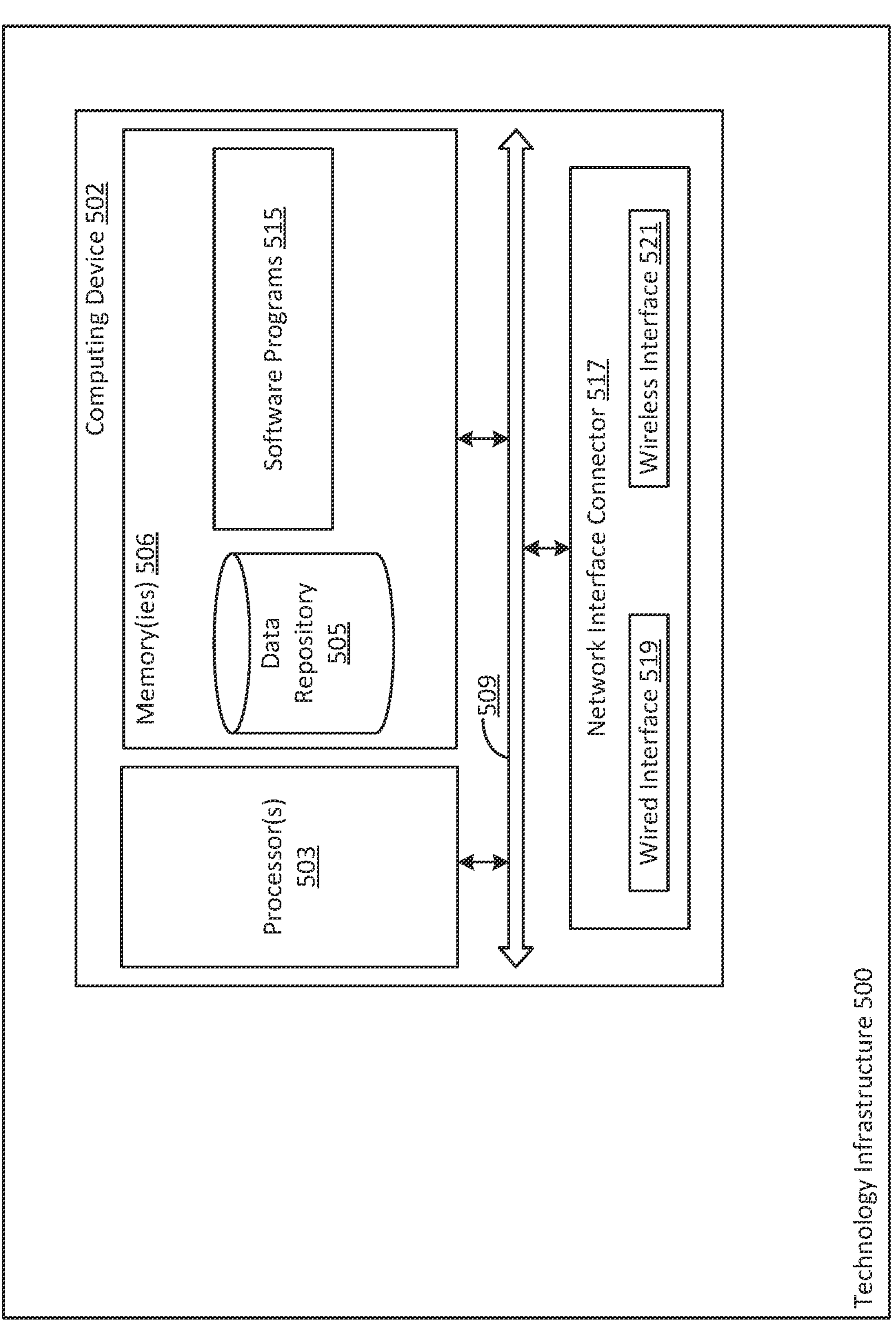
FIG. 5 illustrates a block diagram of a technology infrastructure and computing device for implementing certain aspects of the present disclosure, in accordance with aspects.

FIG. 5 illustrates a block diagram of a technology infrastructure and computing device for implementing certain aspects of the present disclosure, in accordance with aspects. FIG. 5 includes technology infrastructure 500. Technology infrastructure 500 represents the technology infrastructure of an implementing organization. Technology infrastructure 500 may include hardware such as servers, client devices, and other computers or processing devices. Technology infrastructure 500 may include software (e.g., computer) applications that execute on computers and other processing devices. Technology infrastructure 500 may include computer network mediums, and computer networking hardware and software for providing operative communication between computers, processing devices, software applications, procedures and processes, and logical flows and steps, as described herein.

Exemplary hardware and software that may be implemented in combination where software (such as a computer application) executes on hardware. For instance, technology infrastructure 500 may include webservers, application servers, database servers and database engines, communication servers such as email servers and SMS servers, client devices, etc. The term "service" as used herein may include software that, when executed, receives client service requests and responds to client service requests with data and/or processing procedures. A software service may be a commercially available computer application or may be a custom-developed and/or proprietary computer application. A service may execute on a server. The term "server" may include hardware (e.g., a computer including a processor and a memory) that is configured to execute service software. A server may include an operating system optimized for executing services. A service may be a part of, included with, or tightly integrated with a server operating system. A server may include a network interface connection for interfacing with a computer network to facilitate operative communication between client devices and client software, and/or other servers and services that execute thereon.

Server hardware may be virtually allocated to a server operating system and/or service software through virtualization environments, such that the server operating system or service software shares hardware resources such as one or more processors, memories, system buses, network interfaces, or other physical hardware resources. A server operating system and/or service software may execute in virtualized hardware environments, such as virtualized operating system environments, application containers, or any other suitable method for hardware environment virtualization.

Technology infrastructure 500 may also include client devices. A client device may be a computer or other processing device including a processor and a memory that stores client computer software and is configured to execute client software. Client software is software configured for execution on a client device. Client software may be configured as a client of a service. For example, client software may make requests to one or more services for data and/or processing of data. Client software may receive data from, e.g., a service, and may execute additional processing, computations, or logical steps with the received data. Client software may be configured with a graphical user interface such that a user of a client device may interact with client computer software that executes thereon. An interface of client software may facilitate user interaction, such as data entry, data manipulation, etc., for a user of a client device.

A client device may be a mobile device, such as a smart phone, tablet computer, or laptop computer. A client device may also be a desktop computer, or any electronic device that is capable of storing and executing a computer application (e.g., a mobile application). A client device may include a network interface connector for interfacing with a public or private network and for operative communication with other devices, computers, servers, etc., on a public or private network.

Technology infrastructure 500 includes network routers, switches, and firewalls, which may comprise hardware, software, and/or firmware that facilitates transmission of data across a network medium. Routers, switches, and firewalls may include physical ports for accepting physical network medium (generally, a type of cable or wire—e.g., copper or fiber optic wire/cable) that forms a physical computer network. Routers, switches, and firewalls may also have "wireless" interfaces that facilitate data transmissions via radio waves. A computer network included in technology infrastructure 500 may include both wired and wireless components and interfaces and may interface with servers and other hardware via either wired or wireless communications. A computer network of technology infrastructure 500 may be a private network but may interface with a public network (such as the internet) to facilitate operative communication between computers executing on technology infrastructure 500 and computers executing outside of technology infrastructure 500.

FIG. 5 further depicts exemplary computing device 502. Computing device 502 depicts exemplary hardware that executes the logic that drives the various system components described herein. Servers and client devices may take the form of computing device 502. While shown as internal to technology infrastructure 500, computing device 502 may be external to technology infrastructure 500 and may be in operative communication with a computing device internal to technology infrastructure 500.

In accordance with aspects, system components such as a runtime analysis server, an inference server, a machine learning engine, a machine learning model, client devices, servers, various database engines and database services, and other computer applications and logic may include, and/or execute on, components and configurations the same, or similar to, computing device 502.

Computing device 502 includes a processor 503 coupled to a memory 506. Memory 506 may include volatile memory and/or persistent memory. The processor 503 executes computer-executable program code stored in memory 506, such as software programs 515. Software programs 515 may include one or more of the logical steps disclosed herein as a programmatic instruction, which can be executed by processor 503. Memory 506 may also include data repository 505, which may be nonvolatile memory for data persistence. The processor 503 and the memory 506 may be coupled by a bus 509. In some examples, the bus 509 may also be coupled to one or more network interface connectors 517, such as wired network interface 519, and/or wireless network interface 521. Computing device 502 may also have user interface components, such as a screen for displaying graphical user interfaces and receiving input from the user, a mouse, a keyboard and/or other input/output components (not shown).

In accordance with aspects, services, modules, engines, etc., described herein may provide one or more application programming interfaces (APIs) in order to facilitate communication with related/provided computer applications and/or among various public or partner technology infrastructures, data centers, or the like. APIs may publish various methods and expose the methods, e.g., via API gateways. A published API method may be called by an application that is authorized to access the published API method. API methods may take data as one or more parameters or arguments of the called method. In some aspects, API access may be governed by an API gateway associated with a corresponding API. In some aspects, incoming API method calls may be routed to an API gateway and the API gateway may forward the method calls to internal services/modules/engines that publish the API and its associated methods.

A service/module/engine that publishes an API may execute a called API method, perform processing on any data received as parameters of the called method, and send a return communication to the method caller (e.g., via an API gateway). A return communication may also include data based on the called method, the method's data parameters and any performed processing associated with the called method.

API gateways may be public or private gateways. A public API gateway may accept method calls from any source without first authenticating or validating the calling source. A private API gateway may require a source to authenticate or validate itself via an authentication or validation service before access to published API methods is granted. APIs may be exposed via dedicated and private communication channels such as private computer networks or may be exposed via public communication channels such as a public computer network (e.g., the internet). APIs, as discussed herein, may be based on any suitable API architecture. Exemplary API architectures and/or protocols include SOAP (Simple Object Access Protocol), XML-RPC, REST (Representational State Transfer), or the like.

The various processing steps, logical steps, and/or data flows depicted in the figures and described in greater detail herein may be accomplished using some or all of the system components also described herein. In some implementations, the described logical steps or flows may be performed in different sequences and various steps may be omitted. Additional steps may be performed along with some, or all of the steps shown in the depicted logical flow diagrams. Some steps may be performed simultaneously. Some steps may be performed using different system components. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing device," a "computing device," a "computer," an "electronic device," a "mobile device," a "client device," a "server," etc. As used herein, these terms (unless otherwise specified) are to be understood to include at least one processor that uses at least one memory. The at least one memory may store a set of instructions. The instructions may be either permanently or temporarily stored in the memory or memories of the processing device. The processor executes the instructions that are stored in the memory or memories in order to process data. A set of instructions may include various instructions that perform a particular step, steps, task, or tasks, such as those steps/tasks described above, including any logical steps or logical flows described above. Such a set of instructions for performing a particular task may be characterized herein as an application, computer application, program, software program, service, or simply as "software." In one aspect, a processing device may be or include a specialized processor. As used herein (unless otherwise indicated), the terms "module," and "engine" refer to a computer application that executes on hardware such as a server, a client device, etc. A module or engine may be a service.

As noted above, the processing device executes the instructions that are stored in the memory or memories to process data. This processing of data may be in response to commands by a user or users of the processing device, in response to previous processing, in response to a request by another processing device and/or any other input, for example. The processing device used to implement the invention may utilize a suitable operating system, and instructions may come directly or indirectly from the operating system.

The processing device used to implement the invention may be a general-purpose computer. However, the processing device described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing device be physically located in the same geographical place. That is, each of the processors and the memories used by the processing device may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing device what to do with the data being processed.

Further, it is appreciated that the instructions or set of instructions used in the implementation and operation of the invention may be in a suitable form such that the processing device may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing device, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing device, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing device, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing device that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing device or machines that are used to implement the invention. As used herein, a user interface includes any hardware, software, or combination of hardware and software used by the processing device that allows a user to interact with the processing device. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing device as it processes a set of instructions and/or provides the processing device with information. Accordingly, the user interface is any device that provides communication between a user and a processing device. The information provided by the user to the processing device through the user interface may be in the form of a command, a selection of data, or some other input, for example.

As discussed above, a user interface is utilized by the processing device that performs a set of instructions such that the processing device processes data for a user. The user interface is typically used by the processing device for interacting with a user either to convey information or receive information from the user. However, it should be appreciated that in accordance with some aspects of the system and method of the invention, it is not necessary that a human user actually interact with a user interface used by the processing device of the invention. Rather, it is also contemplated that the user interface of the invention might interact, i.e., convey and receive information, with another processing device, rather than a human user. Accordingly, the other processing device might be characterized as a user. Further, it is contemplated that a user interface utilized in the system and method of the invention may interact partially with another processing device or processing devices, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:

determining an optimal code block from a plurality of code blocks, wherein the plurality of code blocks each solve a predetermined problem, and wherein the optimal code block optimizes a coding efficiency, wherein the coding efficiency is carbon efficiency;

executing each code block in the plurality of code blocks;

analyzing metrics, including power consumption, generated for each code block while executing each code block;

generating an improvement score comprising a central processing unit utilization, a memory allocation, a data transfer, an API call, and a power consumption based on a runtime analysis of each code block;

ranking each code block based on the improvement score, wherein the optimal code block is a highest-ranking code block;

pairing the optimal code block with suboptimal code blocks from the plurality of code blocks, wherein the pairing generates suboptimal-to-optimal code pairs as language state representations;

training a machine learning model with the suboptimal-to-optimal code pairs, wherein the training fine-tunes the machine learning model for inferring edits to input code blocks by updating one or more weights of the machine learning model, and wherein the edits to the input code blocks optimize the input code blocks in terms of the coding efficiency, a compile issue, and a unit test failure; and generating and executing an updated code block including the edits.

2. The method of claim 1, wherein the input code block is received from an integrated development environment (IDE) program.

3. The method of claim 2, wherein the machine learning model is executed on a same device as the IDE program.

4. The method of claim 2, wherein the machine learning model is executed on a remote server.

5. A system comprising at least one computer including a processor and a memory, wherein the at least one computer is configured to:

determine an optimal code block from a plurality of code blocks, wherein the plurality of code blocks each solve a predetermined problem, and wherein the optimal code block optimizes a coding efficiency, wherein the coding efficiency is carbon efficiency;

execute each code block in the plurality of code blocks;

analyze metrics, including power consumption, generated for each code block while executing each code block;

generate an improvement score comprising a central processing unit utilization, a memory allocation, a data transfer, an API call, and a power consumption based on a runtime analysis of each code block;

rank each code block based on the improvement score, wherein the optimal code block is a highest-ranking code block;

pair the optimal code block with suboptimal code blocks from the plurality of code blocks, wherein the pairing generates suboptimal-to-optimal code pairs as language state representations; and train a machine learning model with the suboptimal-to-optimal code pairs, wherein the training fine-tunes the machine learning model for inferring edits to input code blocks by updating one or more weights of the machine learning model, and wherein the edits to the input code blocks optimize the input code blocks in terms of the coding efficiency, a compile issue, and a unit test failure; and generate and execute an updated code block including the edits.

6. The system of claim 5, wherein the input code block is received from an integrated development environment (IDE) program.

7. The system of claim 6, wherein the machine learning model is executed on a same device as the IDE program.

8. The system of claim 6, wherein the machine learning model is executed on a remote server.

9. A non-transitory computer readable storage medium, including instructions stored thereon, which instructions, when read and executed by one or more computer processors, cause the one or more computer processors to perform steps comprising:

determining an optimal code block from a plurality of code blocks, wherein the plurality of code blocks each solve a predetermined problem, and wherein the optimal code block optimizes a coding efficiency, wherein the coding efficiency is carbon efficiency;

executing each code block in the plurality of code blocks;

analyzing metrics, including power consumption, generated for each code block while executing each code block;

generating an improvement score comprising a central processing unit utilization, a memory allocation, a data transfer, an API call, and a power consumption based on a runtime analysis of each code block;

ranking each code block based on the improvement score, wherein the optimal code block is a highest-ranking code block;

pairing the optimal code block with suboptimal code blocks from the plurality of code blocks, wherein the pairing generates suboptimal-to-optimal code pairs as language state representations; and training a machine learning model with the suboptimal-to-optimal code pairs, wherein the training fine-tunes the machine learning model for inferring edits to input code blocks by updating one or more weights of the machine learning model, and wherein the edits to the input code blocks optimize the input code blocks in terms of the coding efficiency, a compile issue, and a unit test failure; and generating and executing an updated code block including the edits.

10. The non-transitory computer readable storage medium of claim 9, wherein the input code block is received from an integrated development environment (IDE) program.

11. The non-transitory computer readable storage medium of claim 10, wherein the machine learning model is executed on a remote server.

* * * * *